United States Patent
Crist

[11] 3,891,906
[45] June 24, 1975

[54] VOLTAGE AMPLITUDE CONTROLLED REVERSING D.C. POWER CIRCUIT

[76] Inventor: Elester M. Crist, 3924 Anastasia St., San Diego, Calif. 92111

[22] Filed: Apr. 22, 1974

[21] Appl. No.: 462,664

[52] U.S. Cl. ............ 318/257; 46/244 A; 104/149; 273/86 B; 307/38; 318/285
[51] Int. Cl.² .................... H02P 7/06; H02P 7/68
[58] Field of Search ......... 46/244 A; 104/149, 151; 273/86 B; 307/38, 41; 318/257, 55, 285, 345

[56] References Cited
UNITED STATES PATENTS

| | | | |
|---|---|---|---|
| 1,778,465 | 10/1930 | Ozanne | 104/149 |
| 2,754,432 | 7/1956 | Mostek | 104/149 |
| 3,220,356 | 11/1965 | Leslie | 104/151 |
| 3,736,484 | 5/1973 | Reynolds et al. | 46/244 A |
| 3,753,065 | 8/1973 | Chiles | 318/257 |

Primary Examiner—William H. Beha, Jr.
Attorney, Agent, or Firm—Brown & Martin

[57] ABSTRACT

The circuit permits control of two D.C. motors in both speed and direction over a single pair conductor line. Control circuits produce D.C. voltage of regulated amplitude. The controlled circuits are responsive to D.C. voltage pulses of opposite polarity. A zener diode passes voltages above a predetermined level and activates switches that cause the motor to run in a first direction. Voltages that do not peak at a level sufficient to initiate zener diode breakdown are utilized to activate a second set of switches and run the D.C. motor in a second direction. A capacitor permits sufficient time delay in the second set of switches for voltages of sufficient amplitude to peak and activate the zener diode. Once the zener diode is activated the second set of switches are latched off.

10 Claims, 2 Drawing Figures

VOLTAGE AMPLITUDE CONTROLLED REVERSING D.C. POWER CIRCUIT

BACKGROUND OF THE INVENTION

In various applications it is desirable to be able to remotely control over a single pair line, in both magnitude and polarity, the power delivered to a power utilization device. The problem is typified by the requirement to remotely control a D.C. motor in a model "slot" car. It is well known that it would be desirable to be able to independently control two of such slot cars in both direction and speed, while permitting both cars to run in a common slot or otherwise draw power from a common source. The circuitry proposed thus far to accomplish this purpose has been excessively complex, particularly for the cost-limited slot car market. Typically, some type of frequency multiplexing has been employed with the requirement for filtering the selected power spectrum for each of the cars to be utilized, and then detecting and producing usable motor power from the multiplexed power spectra. The complexity of such systems has limited their practical application.

Therefore it is desirable to have a device for independently controlling each of the two power utilization devices in both amplitude and polarity over a single pair conductor line. Such a device is particularly desirable if it incorporates D.C. circuitry and is relatively low in cost.

SUMMARY OF THE INVENTION

An exemplary embodiment of the invention incorporates a controlled circuit responsive to a source of regularly pulsing D.C. power of a particular polarity. The circuit is protected from pulsations of the opposite polarity by a pair of diodes. D.C. power is delivered through a first of these diodes to a regulation means comprising a zener diode. The regulation means is connected to three voltage divider circuits between the zener diode and ground. The voltage divider circuits act as switch operator means for a first pair of electronic switches comprising silicon controlled rectifiers (S.C.R.) Accordingly, the voltage split point on the two of the voltage dividers is connected to the gate of the two S.C.R.'s comprising electronic switches in the power utilization device circuit. The first S.C.R. in the pair of S.C.R.'s in the first electronic switch means connects the power delivered through the second isolation diode to the first input-output terminal of the power utilization device and from the second input-output terminal of that device to ground.

In the exemplary embodiment the power utilization device comprises a D.C. motor which is therefore induced to run in a first direction when the first set of electronic switches are activated.

A second pair of S.C.R.'s are connected from the source of power through the second isolation diode so that when these switches are activated the power is delivered to the second input-output terminal and then from the first input-output terminal to ground. A voltage divider network comprises a second switch operator means for the second pair of S.C.R.'s and is connected between the source of power and ground. Thus, any time sufficient voltage is delivered from the source of power, the second switch operator means will attempt to turn on the second pair of electronic switches. However, an additional gate current grounding S.C.R. is connected to short the gate supply circuit of the second pair of S.C.R.'s to ground. This gate current grounding S.C.R. is controlled by the third voltage divider network in the first switch operator circuit so that when peak voltages exceed the breakdown voltage of the zener diode the gate current grounding S.C.R. is gated on and draws gate current away from the second set of S.C.R.'s holding them off. During the time interval before the voltage pulse reaches zener breakdown voltage, a capacitor acts as a time delay, drawing power away from the gate circuit for the second pair of electronic switches and holding them off until the gate current grounding S.C.R. is switched on.

It is therefore an object of the invention to provide a new and improved voltage amplitude controlled reversing D.C. power circuit.

It is another object of the invention to provide a new and improved controlled reversing circuit which is relatively low in cost.

It is another object of the invention to provide a new and improved controlled reversing circuit in which two power utilization devices may be controlled over a single pair line by the use of D.C. voltages only.

It is another object of the invention to provide a new and improved controlled reversing circuit that utilizes a relatively simple control circuit.

Other objects and many attendant advantages of the invention will become more apparent upon a reading of the following detailed description together with the drawings in which like reference numerals refer to like parts throughout and in which.

Figure 1:
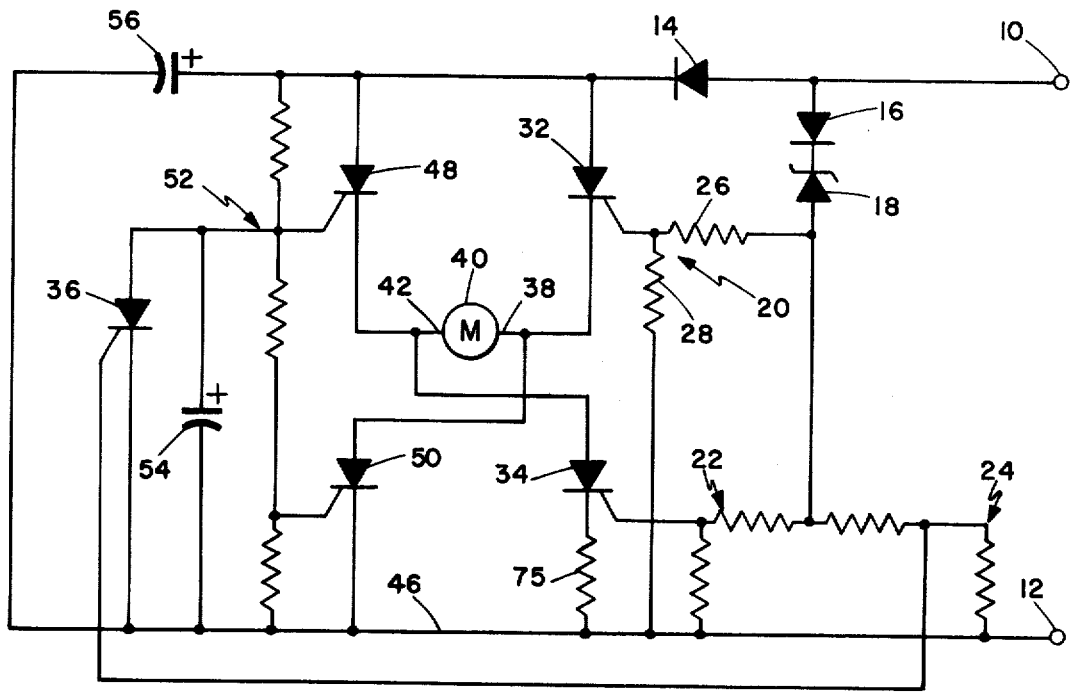
FIG. 1 is a wiring diagram of the voltage controlled reversing circuit.

The controlled reversing circuit is illustrated in FIG. 1. The circuit includes terminals 10 and 12 which are the only external connections for the circuit and which supply the regularly pulsating current from the power supply and control circuitry. The diodes 14 and 16 pass positive voltage pulses and block negative pulses from the utilization portions of the circuit.

The zener diode 18 begins to conduct after positive voltage peaks reach a predetermined amplitude. At this amplitude voltage is presented to each of the three voltage dividers 20, 22 and 24. Each of the voltage dividers is comprised of a pair of resistors 26 and 28 the values for which are selected to provide current isolation amongst the several components serviced and to provide sufficient gate bias to the controlled S.C.R.'s 32 and 34 and 36 to turn the S.C.R.'s on in the manner of an electronic switch when current is passed by the zener diode 18. When S.C.R. 32 begins conducting, power is supplied through diode 14 and is delivered to the first input terminal 38 of motor 40. S.C.R. 34 is also on in this condition and provides a conductive path from the second input-output terminal 42 of motor 40 to ground potential one line 46 through power limiting resistor 75. A second current path through the motor 40 is provided through the electronic switches 48 and 50, which are controlled by a gate biasing voltage divider 52. A capacitor 54 acts to delay the initiation of conduction through the S.C.R.'s 48 and 50 until the D.C. voltage pulse has sufficient time to exceed the breakdown voltage of the diode 18. During this buildup the capacitor 54 acts as an effective short in the gate bias circuit thereby holding the S.C.R.'s 48 and 50 off.

If the zener breakdown voltage is reached then S.C.R. 36 commenses conduction, thereby maintaining the short and withholding the current from S.C.R. 48 and 50. Thus the capacitor 54 in conjunction with the S.C.R. 36 prevents the motor 40 from commencing rotation in a direction opposite to that intended.

For those voltages which are below zener diode 18's breakdown voltage, and after the capacitor 54 is charged, gate bias will be provided to the S.C.R. 48 and 50 through the voltage divider network 52. Thus power is connected to the second input-output terminal of the motor, and S.C.R. 50 will connect between the first input-output of the motor and ground potential on line 46. The capacitor 56 acts as a filter for the D.C. voltage pulses thereby limiting the voltage excursions on the power presented to motor 40 through either the path of S.C.R. 48 or of S.C.R. 32. Diode 14 performs the additional function of excluding the filtering effect of capacitor 56 from the D.C. pulsations presented to zener diode 18, thereby permitting the diode to be exposed to the full voltage excursion.

Figure 2:
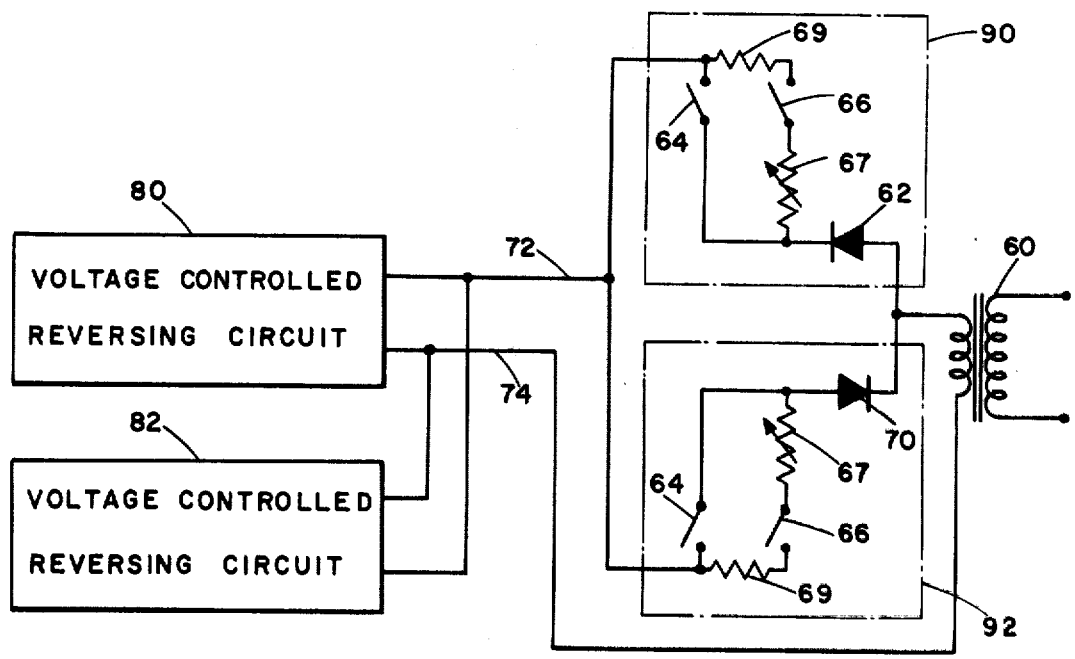
FIG. 2 is a wiring diagram of two reversing circuits coupled to variable control circuits.

Referring now to FIG. 2, two control circuits according to the invention are shown in relationship to two controlled reversing circuits, A transformer, 60 steps down the 115v A.C. 60Hz current to an appropriate voltage value. The transformed A.C. is presented to diode 62 in the first control circuit 90. A high voltage switch 64, and variable low voltage switch 66, are connected to the diode 62. Voltage variation is obtained by variable resistor 67 in series with maximum voltage limiting fixed resistor 69. By selection of the appropriate one of the switches 64 and 66, either high voltage D.C. or variable low voltage D.C. may be presented to the controlled reversing circuits on lines 72 and 74. The second control circuit 92 is identical to the first except that the diode 70 is wired in opposite polarity to the diode 62 and thus rectifies the opposite half cycle of the A.C. current. Thus, the composite signal presented on line 70 and 72 is made up of a first D.C. pulsation from control circuit 90 being of a first polarity and a second recitifed D.C. pulsation of the opposite polarity from the control circuit 92. Each of the controlled reversing circuits 80 and 82 are identical and are sensitive to positive going D.C. pulses only. Therefore, by wiring the circuits 80 and 82 with opposite polarity the first controlled reversing circuit 80 will be sensitive to D.C. pulsations from the control circuit 90 and the second controlled reversing circuit 82 will be responsive to D.C. pulsations produced by control circuit 92.

OPERATION

In a working environment each of the controlled reversing circuits would be placed in the mechanism to be controlled, such as a model slot car. Power would be delivered to the slot car on a two connector line corresponding to conductors 72 and 74 which may be, for example, the D.C. power supply slot usually incorporated in such devices. In a typical operation each operator of the device would use a pair of switches 64 and 66 and the variable resistor control 67. For motor forward and speed control the operator closes switch 66. This provides D.C. power pulses of a polarity which is detected by the controlled reversing circuit 80 but do not effect the controlled reversing circuit 82. Since the resistor 69 is selected so that the maximum voltage does not exceed the peak of the zener diode 18, power is delivered through the S.C.R.'s 48 and 50 causing the motor 40 to run in a first direction. The speed of the motor is controlled by the variable resistor 67. At the same time as the first vehicle is operated by the first operator, a second operator using control 92 can select a mode of operation for the controlled reversing circuit 82. Since the control circuit 92 produces D.C. voltage pulsations of opposite polarity the output of control circuit 92 is detected and utilized only by controlled reversing circuit 82. When switch 64 is closed, the full rectified D.C. pulsation peaks are applied to the zener diode 18, causing current to flow in the gate bias circuit for S.C.R.'s 32, 34 and 36. The gates in S.C.R. 48 and 50 are held at ground potential by the effective short created during the voltage buildup of capacitor 54. Initiation of conduction in diode 18 clamps S.C.R.'s 48 and 50 off, by the action of S.C.R. 36. S.C.R. 36 also discharges capacitor 54 for equivalent use at the next voltage peak. With the motor running the reverse direction speed and power are controlled by the selection of resistor 75 to be appropriate to the use intended and to prevent motor damage from excessive current.

Thus, either controlled reversing circuit may be operated in either direction independently of the other voltage controlled circuit and one circuit does not interefere with the operation of the other.

Having described my invention, I now claim:

1. Voltage amplitude controlled reversing D.C. power circuit comprising:
   a source of electrical power having a regularly pulsating voltage amplitude,
   regulation means connected to said source of electrical power for passing D.C. power exceeding a predetermined voltage amplitude,
   a polarity sensitive D.C. power utilization device having first and second input-output terminals,
   first electronic switch means for connecting said first input-output terminal to said source of electrical power,
   second electronic switch means for connecting said second input-output terminal to said source of electrical power,
   first switch operator means connected to said regulation means for turning on said first electronic switch means and turning off and holding off said second electronic switch means in response to said regulation means passing electrical power above a predetermined voltage level,
   second switch operator means connected to said source of electrical power for turning on said second electronic switch means in response to voltage levels below said predetermined voltage amplitude.

2. The voltage amplitude controlled reversing D.C. power supply circuit according to claim 1 further including:
   a delay means connected to said electronic switch means for delaying the action of said second switch operator means and permitting voltage pulses having sufficient amplitude to actuate said first switch operator means.

3. The voltage amplitude controlled reversing D.C. power supply circuit according to claim 1 further including:
   said first electronic switch means comprises a first S.C.R. connected between said source of electrical power and said first input-output terminal and a second S.C.R. connected between said second input-output terminal and ground, said second electronic switch means comprises a first S.C.R. connected between said source of electrical power and said second input-output terminal and a second S.C.R. connected between said first input-output terminal and ground.

4. The voltage amplitude controlled reversing D.C. power supply circuit according to claim 3 including:
said first and second switch operator means comprise voltage dividers connected to the gates of said S.C.R.'s comprising said first and second electronic switch means and supplying gate current thereto.

5. The voltage amplitude controlled reversing D.C. power supply circuit according to claim 4 including:
said first switch operator means further comprises a third S.C.R. connected between the gate current supply and ground on said S.C.R.'s comprising said second electronic switch means.

6. The voltage amplitude controlled reversing D.C. power supply circuit according to claim 5 including:
said delay means comprises a capacitor connected between said gate current supply and ground.

7. The voltage amplitude controlled reversing D.C. power supply circuit according to claim 6 further including:
filter means for filtering said pulsating voltage from said source from reaching said power utilization device through said second electronic switch means,
diode means for isolating said filter from said regulation means,
said regulation means comprising a zener diode,
said utilization device comprising a D.C. motor.

8. The voltage amplitude controlled reversing D.C. power supply circuit according to claim 6 further including:
said source of electrical power comprises at least one control circuit means for delivering rectified A.C. at a first voltage range below said predetermined voltage amplitude and at a second voltage range above said predetermined voltage amplitude.

9. The voltage amplitude controlled reversing D.C. power supply circuit according to claim 8 wherein:
said first voltage is variable in said first voltage range by a variable resistor.

10. The voltage amplitude controlled reversing D.C. power supply circuit according to claim 8 further comprising:
isolation means in said controlled circuit for making said circuit responsive to voltage of a single polarity,
two of said control circuits producing rectified A.C. of opposite polarity and connected to two of said D.C. power controlled circuits over a single two conductor line,
the first of said D.C. power controlled circuits being responsive to voltages produced by one of said control circuits and the second D.C. power controlled circuit being responsive to voltages produced by the other of said control circuits.

* * * * *